United States Patent
Chan et al.

(10) Patent No.: US 6,879,318 B1
(45) Date of Patent: Apr. 12, 2005

(54) TOUCH SCREEN MOUNTING ASSEMBLY FOR LCD PANEL AND METHOD FOR FABRICATION

(75) Inventors: Ching-Hsiang Chan, Hsinchu (TW); Hong-Yu Lin, Hsin-Chu (TW)

(73) Assignee: Industrial Technology Research Institute, Hsinchu (TW)

(*) Notice: Subject to any disclaimer, the term of this patent is extended or adjusted under 35 U.S.C. 154(b) by 542 days.

(21) Appl. No.: 09/684,058

(22) Filed: Oct. 6, 2000

(51) Int. Cl.[7] .................................................. G09G 5/00
(52) U.S. Cl. ..................................... 345/173; 178/18.01
(58) Field of Search .................................. 345/173, 174, 345/175, 176, 177, 178; 361/681, 682; 348/843, 844, 836, 838, 839; 248/917; 178/18.01, 18.02, 18.03, 18.04, 18.05, 18.06, 18.07, 18.08, 18.09, 18.11, 19.01, 19.02, 19.03, 19.04, 19.05, 19.06, 19.07

(56) References Cited

U.S. PATENT DOCUMENTS

| | | | | |
|---|---|---|---|---|
| 4,511,760 A | * | 4/1985 | Garwin et al. | 178/18.03 |
| 4,675,569 A | * | 6/1987 | Bowman et al. | 310/328 |
| 4,898,555 A | * | 2/1990 | Sampson | 445/22 |
| 4,988,837 A | * | 1/1991 | Murakami et al. | 178/18.07 |
| 5,038,142 A | * | 8/1991 | Flower et al. | 341/34 |
| 5,146,354 A | * | 9/1992 | Plesinger | 349/59 |
| 5,579,036 A | * | 11/1996 | Yates, IV | 345/173 |
| 5,835,080 A | * | 11/1998 | Beeteson et al. | 345/173 |
| 6,215,476 B1 | * | 4/2001 | Depew et al. | 345/173 |

* cited by examiner

Primary Examiner—Dennis-Doon Chow
Assistant Examiner—Leland R. Jorgensen
(74) Attorney, Agent, or Firm—Shaw Pittman LLP

(57) ABSTRACT

A touch screen mounting assembly for a liquid crystal display panel (LCD) and a method for fabricating a touch screen mounting assembly for use on a LCD panel are disclosed. The mounting assembly includes a bottom frame that has a plurality of attachment means mounted thereon, a backlight panel that has a plurality of pressure-sensitive transducers mounted thereon, a liquid crystal display panel, and a top frame for exerting pressure when mounted to the bottom frame such that a plurality of compressible springs biases the LCD panel towards the bottom frame when touched or contacted by a user. The pressure-sensitive transducers may be suitably piezoelectric transducers that produce a flow of electricity upon sensing a pressure.

17 Claims, 2 Drawing Sheets

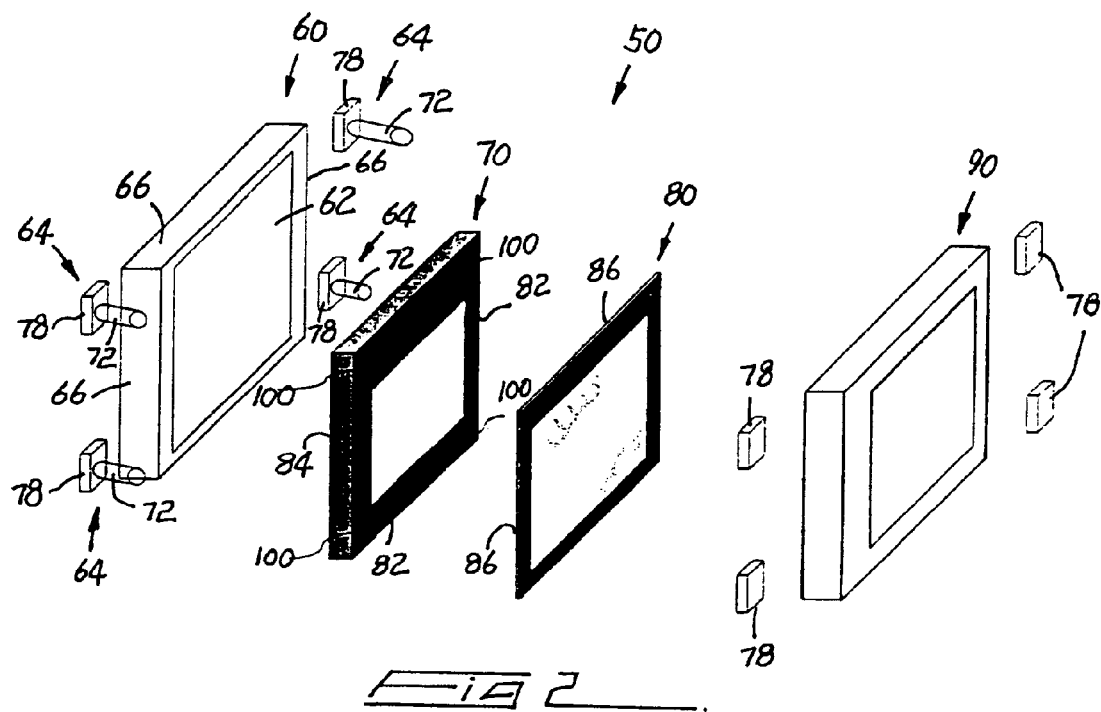
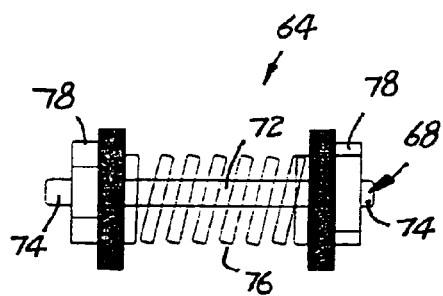

TOUCH SCREEN MOUNTING ASSEMBLY FOR LCD PANEL AND METHOD FOR FABRICATION

FIELD OF THE INVENTION

The present invention generally relates to a touch screen mounting assembly for a display panel and a method for fabrication, and more particularly, relates to a touch screen mounting assembly for a liquid crystal display panel utilizing a plurality of piezoelectric sensors and a method for such fabrication.

BACKGROUND OF THE INVENTION

Electronic display panels, either of the cathode ray tube (CRT) type or of the liquid crystal display (LCD) type, have been widely used in recent years for various electronic display applications. The recent advancement in home computers or personal computers has made such applications even more popular. In the computer display applications, it is sometimes desirable to add the touch screen feature to the display panel such that an interaction between the computer user and the computer can be executed directly without the use of a keyboard or a mouse. Such convenience has further strengthened the even broader usage.

A touch screen, or a touch sensitive display panel typically involves a cathode ray tube monitor and a transparent touch-sensitive overlay that is attached to the front face of the monitor. The display panel may be part of a system including a computer and an internal/external video source for feeding electronic information into the computer. A software program is prepared for execution of the touch screen command of the computer user; for instance, the program determines the response of the system when the display screen is touched at a particular X-Y coordinates. The touch screen action of the computer user executes any desired actions for retrieving or displaying information on a display panel.

Conventionally, touch screen display panels are fabricated by adding a touch sensitive overlay, which is constructed of either a resistor type or a capacitor type. For instance, a series of resistors or capacitors in the form of conductors can be fabricated in layers in the overlay such that, when a particular point of the overlay surface is touched, the two spaced-apart resistors or capacitors are shorted together and thus producing a specific resistance or capacitance value indicative of the X-Y coordinates of the touched location on the overlay.

In recent years, piezoelectric type pressure-sensitive transducers have been used in touch screen display panel applications. For instance, U.S. Pat. No. 4,675,569 discloses such an application for CRTs 25, shown in FIG. 1.

In the CRT application of the piezoelectric transducers, a touch screen is constructed and attached to a conventional CRT 10 that has a front surface 12 and a housing 14. A metal band 16 is secured to the housing 14, including mounting ears 18 at each of the four corners of the housing. The ears 18 are used to bolt the CRT tube to a chassis that has inwardly extending tabs 20. The touch screen assembly 22 is therefore secured to the CRT 10 by the chassis tabs 20, and the CRT ears 18. The touch screen assembly 22 further includes a frame 24, which has integral cones 26 that extend toward the CRT 10 and at each of the four corners of the frame. The cones 26 have openings, which are aligned with the openings in the CRT ears 18, and chassis tabs 20 with deformable grommets 28 mounted in the opening of the cones. A rubber gasket 30 is seated against the surface of the frame 24 and held in place by a number of integral pins 32 that fit into matching openings 34 in the frame 24.

A rigid transparent plate 36, which is made of glass, is seated against the rubber gasket 30 in a recess on the surface of frame 24. The glass plate 36 functions as a push plate for a user to tap or touch during operation of the touch screen panel. The curvature of the plate 36 and the curvature of the plate 24 generally match the curvature of the front surface 12 of the CRT 10. Force-sensitive or piezoelectric transducers 38 are attached to one surface of the plate 36 by using tabs 40 that have layers of adhesive on both surfaces. Each of the transducers 38 is coupled to a connector by a conductor such as a wire 42. The electrical current produced by each of the piezoelectric transducers 38 is proportional to the force exerted of the transducer. The touch screen assembly further requires a flexible, dust impervious frame member 45, which is attached to the parameter of the push plate 36 by adhesive means. The frame member 45 provides a dust seal between the CRT front surface 12 and the push plate 36 to minimize the amount of dust that is attracted to the front surface 12 during operation. The touch screen mounting assembly is further secured to the CRT ears 18 and chassis tabs 20 by means of studs 44 that have threads at both ends. The studs extend through the openings in the cones 26 and are encircled by coil springs 46 which are held in place by fastening elements or washer nuts 48.

The touch screen assembly for the CRT application shown above required the necessary member of the rigid transparent plate, or the glass plate 36 to transfer the touch pressure from the user to the force-sensitive transducers. The use of such glass plate that covers the front surface of the display panel affects the brightness and color of the panel. The negative effect on the brightness and color becomes more severe when the display panel is a liquid crystal display, instead of a CRT display, due to the fact that the LCD display inherently has a lower brightness and color not as vivid. The touch screen mounting assembly disclosed by U.S. Pat. No. 4,675,569 is therefore not adequate for use on a LCD application.

It is therefore an object of the present invention to provide a touch screen mounting assembly for a LCD panel that does not have the drawbacks or shortcomings of the conventional mounting assemblies.

It is another object of the present invention to provide a touch screen mounting assembly for a LCD panel that does not require the use of an additional rigid transparent panel mounted in front of the LCD panel.

It is a further object of the present invention to provide a touch screen mounting assembly for a LCD panel wherein a plurality of pressure-sensitive transducers is mounted directly to the frame of a backlight panel.

It is another further object of the present invention to provide a touch screen mounting assembly for a LCD panel that utilizes a plurality of pressure-sensitive transducers mounted sandwiched between a backlight panel and a liquid crystal display panel.

It is still another object of the present invention to provide a touch screen mounting assembly for a LCD panel by utilizing a plurality of attachment means for mounting a top frame to a bottom frame with a backlight panel, a liquid crystal display panel and a plurality of pressure-sensitive transducers sandwiched therein between.

It is yet another object of the present invention to provide a method for fabricating a touch screen mounting assembly for use on a LCD panel by utilizing a plurality of attachment means incorporating compressible springs and a plurality of pressure-sensitive transducers such as piezoelectric sensors.

SUMMARY OF INVENTION

In accordance with the present invention, a touch screen mounting assembly for a liquid crystal display panel and a method for fabricating a touch screen mounting assembly for use on a LCD panel are disclosed.

In a preferred embodiment, a touch screen mounting assembly for a liquid crystal display panel is provided which includes a bottom frame that has a substantially rectangular-shaped cavity therein for mounting a backlight panel thereto, the bottom frame is equipped with a plurality of attachment means each has a compressible spring situated on an outer periphery of the frame; a backlight panel for supplying illumination to the LCD panel and for mounting to the bottom frame, the backlight panel has a front surface opposite to a back surface that faces the bottom frame, the front surface has a plurality of pressure-sensitive transducers mounted thereto; a liquid crystal display panel positioned juxtaposed to the front surface of the backlight panel sandwiching the plurality of pressure-sensitive transducers therein between; and a top frame for compressing the compressible springs in the plurality of attachment means against the bottom frame by a plurality of tabs mounted peripherally on the top frame such that the plurality of compressible springs biases the LCD panel toward the bottom frame.

In the touch screen mounting assembly for a LCD panel, the bottom frame may be equipped with four attachments means situated at the four distant corners of the bottom frame. The plurality of attachment means each may consist of a threaded stud that has a shaft portion and two end portions, a coil spring situated on and encircle the threaded stud, two fastening means each engaging one of the two end portions. One of the two fastening means may be fastened to the bottom frame while the other fastening means may be fastened to the top frame. The plurality of pressure-sensitive transducers may be four transducers, each mounted to a distant corner on the front surface of the backlight panel. Each of the plurality of pressure-sensitive transducers may be in electrical communication with a pressure-sensing circuit through a wiring. The plurality of pressure-sensitive transducers may be piezoelectric sensors. The top frame may further include a center cavity portion, which has a protective film thereover for protecting a front surface of the LCD panel when the top frame is mounted on the LCD panel. The plurality of pressure-sensitive transducers may be mounted to the front surface of the backlight panel by adhesive means.

The present invention is further directed to a method for fabricating a touch screen mounting assembly for use on a LCD panel which can be carried out by the operating steps of providing a bottom frame that has a substantially rectangular-shaped cavity therein for mounting a backlight panel thereto, the bottom frame may be equipped with a plurality of attachment mean each has a compressible spring and is situated on an outer periphery of the frame; mounting a backlight panel for illuminating the LCD panel to the bottom frame, the backlight panel has a back surface and a front surface, the back surface intimately engages the bottom frame while the front surface has a plurality of pressure-sensitive transducers mounted at each distant corner of the backlight panel; positioning a LCD panel juxtaposed to the front surface of the backlight panel sandwiching the plurality of pressure-sensitive transducers therein between; mounting a top frame to the bottom frame with the backlight panel and the LCD panel sandwiched therein by fastening to the plurality of attachment means; and biasing the LCD panel toward the bottom frame by the plurality of compressible springs.

The method for fabricating a touch screen mounting assembly for use on a LCD panel may further include the step of constructing each of the plurality of attachment means by a threaded stud that has a shaft portion and two end portions, a coil spring situated on and encircle the threaded stud, and two fastening mean each engaging one of said two portions. The method may further include the steps of fastening a first of the two fastening means to the bottom frame, and fastening a second of the two fastening means to the top frame. The method may further include the step of fastening the two fastening means to fastening tabs provided in an outer periphery of the bottom frame and the top frame, respectively. The method may further include the step of attaching the plurality of pressure-sensitive transducers to the front surface of the backlight panel at each distant corner by adhesive means. The method may further include the steps of receiving signals from the plurality of pressure-sensitive transducers by a pressure sensing circuit, and calculating the pressure at each distant corner of the bottom frame to determine a location on the LCD panel that was touched. The method may further include the step of providing four pressure-sensitive transducers with one mounted at each corner of the backlight panel, or the step of providing four piezoelectric sensors with one mounted at each distant corner of the backlight panel.

BRIEF DESCRIPTION OF THE DRAWINGS

These and other objects, features and advantages of the present invention will become apparent from the following detailed description and the appended drawings in which:

FIG. 2 is a perspective view of the present invention touch screen mounting assembly for a liquid crystal display panel.

FIG. 2A is an enlarged, plain view of the attachment means for mounting the present invention touch screen to a LCD panel.

DETAILED DESCRIPTION OF THE PREFERRED EMBODIMENT

Figure 1:
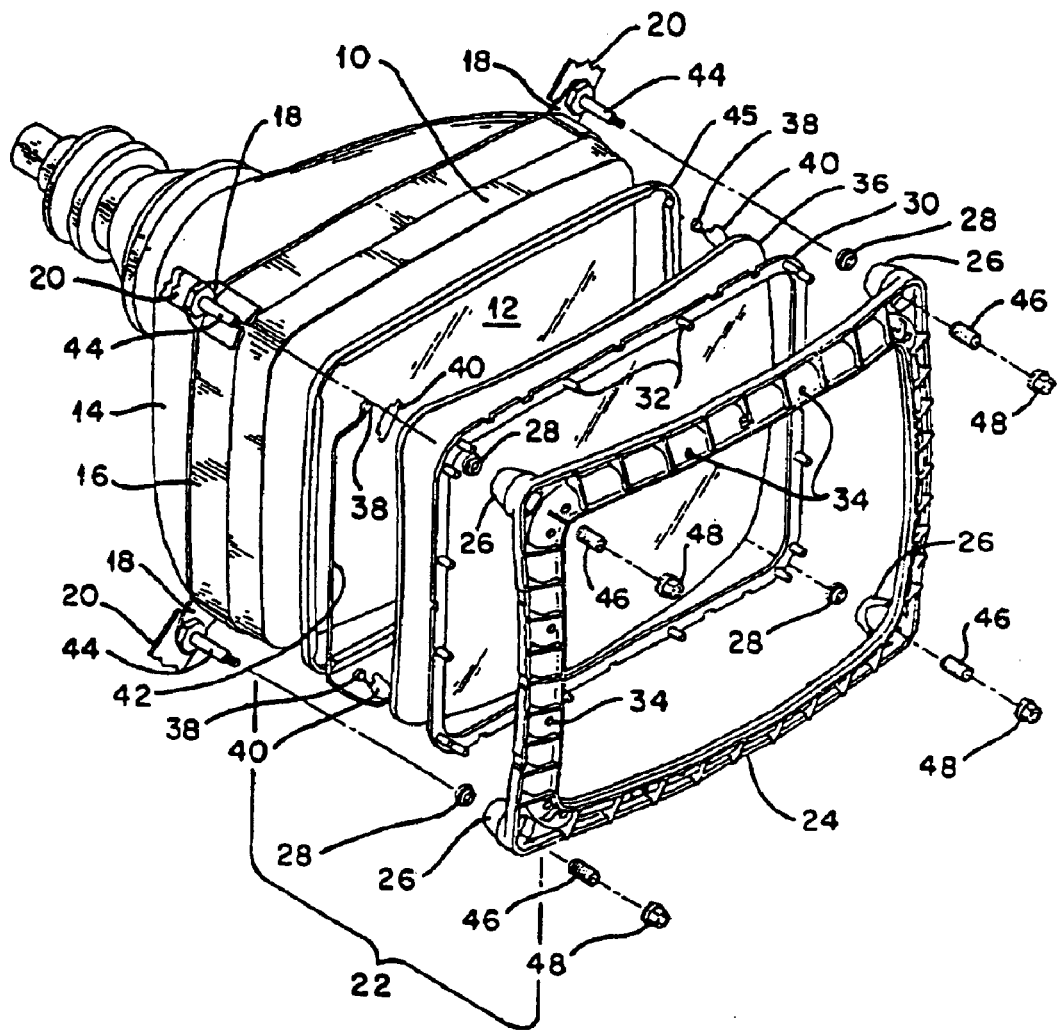
FIG. 1 is a perspective view of a conventional method for mounting a touch screen to a cathode ray tube display panel by using an additional rigid transparent plate.

The present invention discloses a touch screen mounting assembly for a liquid crystal display panel that includes a bottom frame, a backlight panel, a liquid crystal display panel, and a top frame assembled together by a plurality of attachment means with a plurality of pressure-sensitive transducers mounted in between the backlight panel and the liquid crystal display panel. The present invention novel assembly utilizes a flat liquid crystal display panel as the touch panel such that the additional rigid transparent plate utilized in a prior art assembly can be eliminated, and thus eliminating undesirable effects of the rigid transparent plate on the brightness and the color display of the display panel. While such rigid transparent plate may not have a detrimental effect on a CRT display panel which has inherently high brightness and vivid color display, the effect is detrimental on a LCD display panel.

The plurality of pressure-sensitive transducers utilized in the present invention assembly may be advantageously piezoelectric transducers which can be easily mounted to the surface of a backlight panel and pressured by a liquid crystal display panel which is mounted juxtaposed to the backlight panel. The mounting of the present invention touch screen assembly is achieved by a plurality of attachment means, each including a threaded stud that has a shaft portion and two end portions, a coil spring situated on and encircle the threaded stud, and two fastening means, each engaging one of the two end portions. The coil spring of the attachment means enables the LCD panel to be biased toward the bottom frame of the mounting assembly, and thus, any pressure, or touch by a user on the LCD panel can be sensed by the plurality of piezoelectric sensors mounted on the backlight panel. After the signals from the piezoelectric sensors are analyzed by a pressure-sensing circuit, the precise location of the touch in a X-Y coordinate can be accurately determined. The top-mounting frame of the present invention mounting assembly may further include a transparent, protective film extended over a cavity in the frame for protecting the front surface of the liquid crystal display panel after the top frame is mounted thereto.

The present invention touch screen mounting assembly for a LCD Display panel exhibits improved brightness and color of the LCD panel since no intermediate glass plate is required which would otherwise reduce the brightness and color of the LCD panel. The present invention mounting assembly further provides a low cost method for fabrication since the additional cost for the rigid transparent plate is eliminated.

Referring now to FIG. 2, wherein the present invention touch screen mounting assembly 50 is shown. The touch screen mounting assembly 50 consists of a bottom frame 60, a backlight panel 70, a liquid crystal display panel 80, and a top frame 90. As shown in FIG. 2, the bottom frame has a substantially rectangular-shaped cavity 62 therein for mounting a backlight panel 70 thereto. The bottom frame 60 is further equipped with a plurality of attachment means 64, each having a compressible spring 76, or a coil spring, (as shown in FIG. 2A). The plurality of attachment means 64 are mounted on an outer periphery 66 of the bottom frame member 60.

One of the attachment means 64 is shown in an enlarged view in FIG. 2A constructed of a threaded stud 68 that has a shaft portion 72 and two end portions 74. A coil spring 76 is mounted to encircle the threaded stud 68. Two fastening means 78 each engaging one of the two end portions 74 are further provided.

The backlight panel 70 is an illumination device, which may contain fluorescent lighting fixtures therein, or any other suitable illuminating means. The backlight panel 70 supplies illumination to the LCD panel 80 and is mounted to the bottom frame 60. The backlight panel 70 has a front surface 82 that is opposite to a back surface 84 that faces the bottom frame 60. The front surface 82 has a plurality of pressure-sensitive transducers 100 mounted thereto. The plurality of pressure-sensitive transducers may be advantageously piezoelectric transducers, which are readily available from many commercial sources. The piezoelectric transducers 100 preferably has a domed surface that is mounted to face the LCD panel 80 such that a point contact between the transducer 100 and the back surface 86 of the LCD panel 80 is maintained at all times. The output from the transducers 100 is fed to a pressure-sensing circuit (not shown) by a wiring means (not shown). The precise location on the LCD panel 80 that is touched can thus be determined by the pressure-sensing circuit in a X-Y coordinate.

The LCD panel 80 which has a back surface 86 is positioned juxtaposed to the front surface 82 of the backlight panel to sandwich the plurality of piezoelectric transducers 100 therein between. On top of the LCD panel 80 is then installed the top frame member 90 by the plurality of attachment means 64 by compressing the coil springs 76 against the bottom frame 60 with the springs acting on a plurality of tabs, or fastening means 78 that are mounted peripherally on the top frame 90. When the top frame 90 is mounted to the bottom frame 60 sandwiching the backlight panel 70 and the LCD panel 80, the coil springs 76 bias the LCD panel 80 toward the bottom frame 60 such that any slight pressure or contact on the LCD panel 80 can be detected by the plurality, i.e., four piezoelectric transducers 100 to determine the X-Y coordinates of the contact or touch.

While a number of four piezoelectric transducers 100 are illustrated in the present invention preferred embodiment, it should be understood that any syllable numbers of piezoelectric transducers may be utilized to achieve the same desirable result of the present invention novel mounting assembly. For instance, as few as three or as many as ten or twelve transducers may be utilized if necessary.

The present invention novel touch screen mounting assembly for a liquid crystal display panel and a method for fabricating such mounting assembly for use on a LCD panel have therefore been amply described in the above description and in the appended drawings of FIGS. 2 and 2A.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A touch screen mounting assembly for a liquid crystal display (LCD) panel comprising:
    a bottom frame having a substantially rectangular-shaped cavity therein for mounting a backlight panel thereto, said bottom frame being equipped with a plurality of attachment means each having a compressible spring and is situated on an outer periphery of the frame;
    a backlight panel for supplying illumination to said LCD panel and for mounting to said bottom frame, said backlight panel having a front surface opposite to a back surface that faces said bottom frame, said front surface having a plurality of pressure-sensitive transducers mounted thereto;
    a liquid crystal display panel positioned juxtaposed to said front surface of said backlight panel sandwiching said plurality of pressure-sensitive transducers therein between; and
    a top frame for compressing said compressible springs in said plurality of attachment means against said bottom frame by a plurality of tabs mounted peripherally on said top frame such that said plurality of compressible springs bias said LCD panel toward said bottom frame.

2. A touch screen mounting assembly for a LCD panel according to claim 1, wherein said bottom frame being equipped with four attachment means situated at four distant corners of said bottom frame.

3. A touch screen mounting assembly for a LCD panel according to claim 1, wherein said plurality of attachment means each consists of a threaded stud having a shaft portion and two end portions, a coil spring situated on and encircle said threaded stud, two fastening means each engaging one of said two end portions.

4. A touch screen mounting assembly for a LCD panel according to claim 3, wherein one of said two fastening means being fastened to said bottom frame while the other fastening means being fastened to said top frame.

5. A touch screen mounting assembly for a LCD panel according to claim 1, wherein said plurality of pressure-sensitive transducers being four transducers, each mounted to a distant corner on said front surface of said backlight panel.

6. A touch screen mounting assembly for a LCD panel according to claim 1, wherein each of said plurality of pressure-sensitive transducers being in electrical communication with a pressure-sensing circuit through a wiring.

7. A touch screen mounting assembly for a LCD panel according to claim 1, wherein said plurality of pressure-sensitive transducers being piezoelectric sensors.

8. A touch screen mounting assembly for a LCD panel according to claim 1, wherein said top frame further comprising a center cavity portion having a protective film extended thereover for protecting a front surface of said LCD panel when said top frame is mounted on said LCD panel.

9. A touch screen mounting assembly for a LCD panel according to claim 1, wherein said plurality of pressure-sensitive transducers being mounted to said front surface of the backlight panel by adhesive means.

10. A method for fabricating a touch screen mounting assembly for use on a LCD panel comprising the steps of:

providing a bottom frame having a substantially rectangular-shaped cavity therein for mounting a backlight panel thereto, said bottom frame being equipped, with a plurality of attachment means each having a compressible spring situated on an outer periphery of the frame;

mounting a backlight panel for illuminating said LCD panel to said bottom frame, said backlight panel having a back surface and a front surface, said back surface intimately engages said bottom frame while said front surface having a plurality of pressure-sensitive transducers mounted at each distant corner of said backlight panel;

positioning a LCD panel juxtaposed to said front surface of said backlight panel sandwiching said plurality of pressure-sensitive transducers therein between;

mounting a top frame to said bottom frame with said backlight panel and said LCD panel sandwiched therein by fastening to said plurality of attachment means; and biasing said LCD panel toward said bottom frame by said plurality of compressible springs.

11. A method for fabricating a touch screen mounting assembly for use on a LCD panel according to claim 10 further comprising the step of constructing each of said plurality of attachment means by a threaded stud having a shaft portion and two end portions, a coil spring situated on and encircle said threaded stud, and two fastening means each engaging one of said two end portions.

12. A method for fabricating a touch screen mounting assembly for use on a LCD panel according to claim 11 further comprising the steps of:

fastening a first of said two fastening means to said bottom frame; and fastening a second of said two fastening means to said top frame.

13. A method for fabricating a touch screen mounting assembly for use on a LCD panel according to claim 11 further comprising the step of fastening said two fastening means to fastening tabs provided on an outer periphery of said bottom frame and said top frame, respectively.

14. A method for fabricating a touch screen mounting assembly for use on a LCD panel according to claim 10 further comprising the step of attaching said plurality of pressure-sensitive transducers to said front surface of said backlight panel at each distant corner by adhesive means.

15. A method for fabricating a touch screen mounting assembly for use on a LCD panel according to claim 10 further comprising the steps of:

providing a pressure-sensing circuit;

receiving signals from said plurality of pressure-sensitive transducers by said pressure-sensing circuit; and calculating the pressure at each distant corner of said bottom frame to determine a location on said LCD panel that was touched.

16. A method for fabricating a touch screen mounting assembly for use on a LCD panel according to claim 10 further comprising the step of providing four pressure-sensitive transducers with one mounted at each distant corner of said backlight panel.

17. A method for fabricating a touch screen mounting assembly for use on a LCD panel according to claim 10 further comprising the steps of providing four piezoelectric sensors with one mounted at each distant corner of said backlight panel.

* * * * *